United States Patent [19]

Wang

[11] Patent Number: 4,968,768

[45] Date of Patent: Nov. 6, 1990

[54] POLYESTERCARBONATE POLYMER CONTAINING SPIRODI LACTAM MOIETY

[75] Inventor: Pen-Chung Wang, Houston, Tex.

[73] Assignee: Shell Oil Company, Houston, Tex.

[21] Appl. No.: 411,774

[22] Filed: Sep. 25, 1989

[51] Int. Cl.$^5$ ............... C08G 64/00; C08G 63/00
[52] U.S. Cl. .................................................. 528/176
[58] Field of Search ............... 528/176, 185, 190, 196, 528/201, 203

[56] References Cited

U.S. PATENT DOCUMENTS 4,594,404 11/1989 Wang .................................. 548/410

OTHER PUBLICATIONS

"The Mass Spectra of Some Spirodilactams", *Org. Mass. Spectrum*, 17(8), pp. 396–397, Gyorgy Bujtas et al., (1982).

"Optically Active Tricyclic Dilactams with Non-Planar Cis-Amide Groups", *Collect. Czech. Chem. Commun.*, 47(3), pp. 1000–1019, Blaha, Karel et al., (1982).

*Primary Examiner*—Harold D. Anderson
*Assistant Examiner*—T. Mosly

[57] ABSTRACT

Novel polyestercarbonate polymers contain moieties derived from hydroxyaryl-substituted 1,6-diaza [4.4] spirodilactam alternating with moieties derived from a bisphenol haloformate or an aromatic dicarboxylic acid halide, the linking moieties being oxycarbonyl or carbonyldioxy, respectively. The polymers are thermoplastics of relatively high melting points or glass transition temperatures, useful as engineering thermoplastics in elevated temperature applications.

18 Claims, No Drawings

POLYESTERCARBONATE POLYMER CONTAINING SPIRODI LACTAM MOIETY

FIELD OF THE INVENTION

This invention relates to certain novel polyestercarbonate polymers. More particularly, the invention relates to novel alternating polyestercarbonate polymers in which moieties derived from a hydroxyarylsubstituted 1,6-diaza[4.4]spirodilactam alternate with a moiety derived from a bisphenol chloroformate or a moiety derived from an aromatic dicarboxylic acid halide, the moieties being separated by carbonato or carbonyloxy groups, respectively.

BACKGROUND OF THE INVENTION

The class of thermoplastic polymers is well known in the art, being particularly useful in part because of the property exhibited by many of the thermoplastic polymers of being deformable at relatively low temperatures. Thus, such polymers are processed by conventional techniques such as extrusion, injection molding or thermoforming into sheets, films, fibers, molded articles and other useful items without undue degradation of the polymer.

This property that makes many of the thermoplastics particularly useful, i.e., low temperature deformation, also precludes the use of such thermoplastics in engineering applications where exposure to elevated temperature is likely to be encountered. When relatively high temperature applications for thermoplastics are contemplated, it is often useful to employ a thermoplastic which incorporates, within the polymer chain, one or more types of cyclic moiety which typically raises the melting point or glass transition temperature of the polymer. One class of thermoplastics which on occasion incorporates a plurality of cyclic structures is the class of polyarylate polymers. The polyarylate polymers are frequently esters of aromatic diacids and dihydric phenol compounds. In such polymers, 2,2-di(4-hydroxyphenyl)propane, also known as bisphenol A or BPA, is often employed as the phenolic component. In copending U.S. patent application Ser. No. 314,515, filed Feb. 23, 1989, now U.S. Pat. No. 4,910,285 there is described a class of polyarylate polymers wherein moieties derived from a hydroxyarylsubstituted 1,6-diazaspiro[4.4-]nonane-2,7-dione, and optionally a di(hydroxyphenyl)propane, alternate with a moiety of an aromatic dicarboxylic acid.

A second class of thermoplastic polymers is the class known as polycarbonates. These polycarbonates are also produced from aromatic bisphenols such as 2,2-di(4-hydroxyphenyl)propane, generally by reaction with phosgene or by ester exchange with a diaryl carbonate, e.g., diphenyl carbonate. In copending U.S. patent application Ser. No. 279,671, filed Dec. 5, 1988, now U.S. Pat. No. 4,906,725 there are disclosed polycarbonate polymers in which carbonyl groups alternate with moieties derived from a hydroxyarylsubstituted 1,6-diaza[4.4]spirodilactam, and optionally a moiety derived from a di(hydroxyphenyl)alkene. In the embodiment wherein moieties of two types of bisphenol are present, the relationship of the two types of moiety is random. A similar type of polymer of a regular, alternating structure of two bisphenol moieties is disclosed by copending U.S. patent application Ser. No. 411,775, filed Sept. 25, 1989.

Each of the polyarylate polymer and polycarbonate types exhibit properties that render them particularly useful for certain applications. It would be of advantage to provide polymers which incorporate bisphenol and other cyclic moieties which contain linking groups such as the ester or carbonyldioxy groups of the polycarbonate polymers and the carbonato or carbonyldioxy groups of the polycarbonate polymers.

SUMMARY OF THE INVENTION

The present invention provides novel polyestercarbonate polymers having a plurality of types of cyclic structure within the polymeric chain. More particularly, the present invention provides polyestercarbonate polymers wherein moieties derived from a 1,6-di(hydroxyaryl)-1,6-diazaspiro[4.4]nonane-2,7-dione alternate with moieties derived from an aromatic dicarboxylic acid and a di(hydroxyphenyl) compound, the moieties being connected by carbonyloxy groups and carbonato groups, respectively.

DESCRIPTION OF THE INVENTION

The novel polyestercarbonate polymers of the invention are produced by reaction of a salt of 1 1,6-diaza[4.4]spirodilactam having a hydroxyaryl substituent on each spiro ring nitrogen atom with an aromatic dicarboxylic acid halide and a bisphenol haloformate. By reaction of the monomers, typically an interfacial reaction, a polyestercarbonate polymer is produced in which moieties of the hydroxyaryl-substituted spirodilactam alternate with moieties derived from the diacid halide and the bisphenol chloroformate, the spirodilactam moieties being connected to acid halide moieties by ester or oxycarbonyl moieties or to bisphenol haloformate moieties by carbonato or carbonyldioxy groups.

The hydroxyaryl-substituted spirodilactam precursor of the polymers of the invention are [4.4]spirodilactams having spiro ring nitrogen atoms in the 1- and 6-ring positions and having a hydroxyaryl substituent on each of the spiro ring nitrogen atoms. One class of such spirodilactams has up to 60 carbon atoms and is represented by the formula

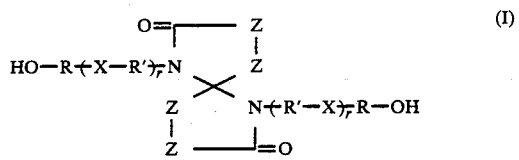

wherein Z independently is $>C(Z')_2$ in which $Z'$ independently is hydrogen, lower alkyl of up to 4 carbon atoms, preferably methyl, halogen, preferably the lower halogens fluorine or chlorine, or aryl, preferably phenyl, or Z is such that two adjacent Z groups taken together form a ring system $Z''$ of from 5 to 7 ring atoms up to two of which are heteroatoms selected from nitrogen, oxygen or sulfur with the remaining ring atoms being carbon atoms, there being up to 15 carbon atoms inclusive in each $Z''$, two of which form a bridge between the carbon atoms connected by the two adjacent Z groups. In the above formula I, R independently is aromatic of up to 15 carbon atoms and up to 2 aromatic rings, inclusive, R' independently is R or aliphatic of up to 10 carbon atoms inclusive, r independently is 0 or 1 and X independently is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone and dioxydiphenylene. Each of R and R' is hydrocarbyl containing only atoms of carbon and hydrogen or are substituted hydrocarbon containing additional atoms in the form of inert carbon atom substituents such as halogen, particularly the middle halogens chloro or bromo.

Spirodilactams of a considerable variety of structures are therefore employed as the spirodilactam precursor of the metal salt reactant in the process of the invention. In the embodiment wherein the Z groups of the above formula I are acyclic and not part of a fused ring substituent, i.e., Z is >C(Z')$_2$, the spirodilactams are illustrated by 1,6-di(4-hydroxyphenyl)-1,6-diazaspiro[4.4]nonane-2,7-dione, 1,6-di(3-hydroxyphenyl)-1,6-diazaspiro[4.4]nonane-2,7-dione, 1,6-di[3-(4-hydroxybenzoyl)phenyl]-1,6-diazaspiro[4.4]nonane-2,7-dione, 1,6-di(4-hydroxy-3-chlorophenyl)-3,3,4,4,8,8,9,9-octamethyl-1,6-diazaspiro[4.4]nonane-2,7-dione, 1,6-di[4-(4'-hydroxybiphenyl)]-3,8-diphenyl-1,6-diazaspiro[4.4]nonane-2,7-dione, 1,6-di[2-(4-hydroxyphenyl)propyl]-1,6-diazaspiro[4.4]nonane-2,7-dione, 1,6-di(4-hydroxyphenyl)-3,4,8,9-tetrafluoro-1,6-diazaspiro[4.4]nonane-2,7-dione and 1,6-di[4-(4-hydroxyphenylisopropyl)phenyl]-1,6-diazaspiro[4.4]nonane-2,7-dione. In the embodiment wherein adjacent Z groups on each spiro ring form a cyclic substituent fused to the spiro ring, i.e., the adjacent Z groups of each spiro ring are Z'', illustrative spirodilactams include 1,6-di(4-hydroxyphenyl)-3,4,8,9-dibenzo-1,6-diazaspiro[4.4]nonane-2,7-dione, 1,6-di[4-(4-hydroxyphenyloxyphenyl)]-3,4,8,9-di(pyrido)-1,6-diazaspiro[4.4]nonane-2,7-dione and 1,6-di(3-hydroxy-3,5-dimethylphenyl)-3,4,8,9-di(cyclohexeno)-1,6-diazaspiro[4.4]nonane-2,7-dione. Also suitable are those spirolactam precursors wherein one spiro ring has a fused ring substituent and one ring does not, e.g., 1,6-di(4-hydroxyphenyl)-3,4-benzo-8-methyl-1,6-diazaspiro[4.4]nonane-2,7-dione and 1,6-di[1-(4-hydroxynaphthyl)]-3,4-cyclopentano-1,6-diazaspiro[4.4]nonane2,7-dione.

In general, compounds of the above formula I wherein R and R' are aromatic and hydrocarbyl are preferred with further preference given to the compounds where r is zero. Within the spirodilactam portion of the molecule, spiro rings which are substituted with hydrogen or methyl are preferred when Z is acyclic and spiro rings substituted with benzo are preferred when adjacent Z groups are Z''. The compound 1,6-di(hydroxyphenyl)-1,6-diazaspiro[4.4]nonane is a particularly preferred member of the former class whereas 1,6-di(4-hydroxyphenyl)-3,4,8,9-dibenzo-1,6-diazaspiro[4.4]nonane-2,7-dione is a particularly preferred member of the latter class.

The hydroxyaryl-substituted spirodilactams of formula I are compounds which are described in more detail and are claimed in copending U.S. patent application Ser. No. 245,618, filed Sept. 16, 1988, incorporated herein by reference. The general process for the production of the spirodilactams, also claimed in this copending U.S. application, is by reaction of at least one hydroxy-containing primary amino compound and a precursor of the spirodilactam. In terms of the substituted spirodilactams of formula I, the hydroxy-containing amino compound is represented by the formula

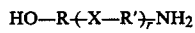

HO—R—(X—R')$_r$—NH$_2$ (II)

wherein R, R' X and r have the previously stated meanings. The precursor of the spirodilactam is a 4-oxoheptanedioic acid compound or a 1,6-dioxa[4.4]spirodilactone compound. In terms of the substituted spirodilactams of formula I, the 4-oxoheptanedioic acid compound is represented by the formula

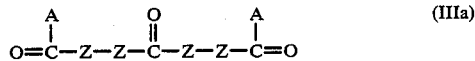

wherein A independently is hydroxy, lower alkoxy or halo, preferably the middle halogens, and Z has the previously stated meaning. When the precursor of the spirodilactam is a spirodilactone, the spirodilactone to be employed for the production of the spirodilactam of formula I is represented by the formula

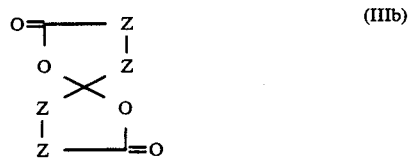

wherein Z has the previously stated meaning.

The acyclic 4-oxoheptanedioic acid compounds are known or are produced by known methods, but certain of the esters are particularly conveniently produced by the process of U.S. Pat. No. 4,800,231 wherein unsaturated carboxylic acid esters react with formaldehyde in the presence of a catalyst system comprising a thiazolium salt and a tertiary amine. The interconversion of the acids, esters or acid halides of formula IIIa is by conventional methods. The product of 4-oxoheptanedioic acid compounds having cyclic moieties is by the process of Cava et al, J. Am. Chem. Soc., 77, 6022 (1955). The spirodilactones of formula IIIb are produced by the process of Pariza et al, Synthetic Communications, Vol. 13(3), pp. 243-254 (1983) or by the process of U.S. Pat. No. 1,999,181.

The hydroxy-containing primary amino compound and the precursor of the spirodilactam will react in a 2:1 molar ratio although in practice reactant ratios from about 8:1 to about 1:1.5 are satisfactory. Reactant ratios which are substantially stoichiometric are preferred. Reaction is conducted in a liquid phase in an inert reaction diluent such as an N-alkylamide, e.g., N,N-dimethylacetamide, N,N-dimethylformamide or N-methyl-2-pyrrolidone. Reaction takes place at an elevated temperature, typically from about 80° C. to about 250° C., and at a reaction pressure sufficient to maintain the reaction mixture in the liquid phase. Such reaction pressures are up to about 20 atmospheres but more often are up to about 10 atmospheres. Subsequent to reaction the hydroxyaryl-substituted spirodilactam is recovered from the product mixture by conventional methods such as solvent removal, precipitation or chromatographic separation. Recovery of the spirodilactam product is not required, however, and particularly in cases where substantially stoichiometric quantities of reactants were employed the spirodilactam can be further reacted in situ to produce the metal salt used as a reactant to produce the polymers of the invention.

The bisphenol haloformate reactant in the process of the invention is a di(chlorocarbonyloxyphenyl) compound of up to 40 carbon atoms. Although a considerable variety of such bisphenol haloformates are suitable for use as a precursor of the polymers of the invention, the preferred di(halocarbonyloxyphenyl) compounds are represented by the formula

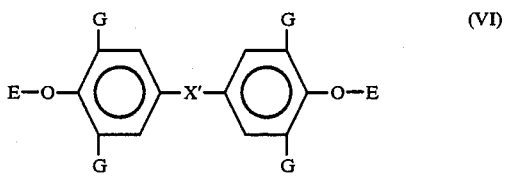

wherein G independently is hydrogen, alkyl, preferably lower alkyl, or halo, preferably the middle halogens chlorine or bromine, X' is alkylene of up to 15 carbon atoms inclusive and E is halocarbonyl, preferably chlorocarbonyl. Illustrative of the di(halocarbonyloxyphenyl)alkanes of formula IV are 2,2-di(4-chlorocarbonyloxyphenyl)propane, di(4-chlorocarbonyloxyphenyl)propane, di(4-chlorocarbonyloxy-3-methylphenyl)methane, 1,2-di(4-chlorocarbonyloxyphenyl)ethane, 2,2-di(4-chlorocarbonyloxy-3,5-dibromophenyl)propane and 4-4-chlorocarbonyloxy-3-chlorophenyl)-4-(4-bromocarbonyloxyphenyl)octane. The preferred X' group is 2,2-propylene and the preferred bisphenol haloformate is 2,2-di(4-chlorocarbonyloxyphenyl)propane.

The dicarboxylic acid halide employed in the process of the invention is the acid halide of an aromatic dicarboxylic acid of up to 30 carbon atoms having two carboxylic acid moieties as substituents on aromatic carbon atoms. One class of such dicarboxylic acid halides is represented by the formula

wherein A' is halogen, particularly the middle halogens and especially chlorine, and R" is divalent arylene of up to 20 carbon atoms and from 1 to 2 aromatic rings which, when two rings are present, are fused or connected by a divalent linking group X" wherein X" independently is X. Illustrative diacid halides include phthaloyl chloride, isophthaloyl chloride, terephthaloyl bromide, 4,4'-dichlorocarbonylbiphenyl, di(4-bromocarbonylphenyl) ketone, isophthaloyl fluoride, 1,3-di(4-chlorocarbonylphenyloxy)benzene, di(3-bromocarbonylphenyl) ether and 1,4-di(chlorocarbonyl)naphthalene. In general, the aromatic diacid halides which are hydrocarbyl except for any additional atoms in the divalent X" groups are preferred and particularly preferred are those diacid halides of one aromatic ring. Best results are obtained when the acid halide moieties are substituted on aromatic ring carbon atoms which are meta to each other, e.g., an isophthaloyl halide, especially isophthaloyl chloride.

The production of the polyestercarbonate polymers of the invention comprises the reaction of the bisphenol haloformate and the diacid halide with a metal salt of the hydroxyaryl-substituted spirodilactam. Although a variety of metal salts are useful in the process, the preferred metal salts are the alkali metal salts, i.e., the lithium, sodium, potassium, rubidium or cesium salts. The sodium and potassium salts of the hydroxyaryl-substituted spirodilactam are particularly useful. The production of the alkali metal salt is by conventional procedures. In one modification, the hydroxyaryl-substituted spirodilactam is dissolved in a suitable solvent such as 1,1,2-trichloroethane and an at least stoichiometric quantity of an alkali metal hydroxide, carbonate or bicarbonate is added to produce the desired alkali metal salt. The alkali metal salt of the hydroxyaryl-substituted spirodilactam is isolated if desired as by solvent removal but typically is reacted further without isolation. In an alternate modification the hydroxyaryl-substituted spirodilactam is contacted with an aqueous solution of the alkali metal source and vigorously agitated to form the alkali metal salt.

By whatever method formed, the alkali metal salt of the hydroxyaryl-substituted spriodilactam is contacted with the bisphenol haloformate and the diacid halide to produce the polyestercarbonate polymers of the invention. The molar ratio of the bisphenol haloformate to the diacid halide is not critical but will control, to a considerable extent, the relative proportions of ester and carbonate linkages within the polymer. Molar ratios of bisphenol haloformate to diacid halide from about 9:1 to about 1:9 are suitable with molar ratios from about 2:1 to about 1:2 being preferred. The molar ratio of the alkali metal salt of the hydroxyaryl-substituted spirodilactam to the other two reactants can also be varied. The stoichiometry of the reaction calls for the number of reacting moles of alkali metal salt to be equal to the total number of moles of the other two reactants. While molar ratios of alkali metal salt of the hydroxyaryl-substituted spirodilactam to the total of the bisphenol haloformate and diacid halide from about 4:1 to about 1:4, best results are obtained when this molar ratio is substantially stoichiometric.

The reaction of the alkali metal salt, the bisphenol haloformate and the diacid halide typically takes place under polymerization conditions in a multiphase liquid reaction system. In what is conventionally termed an interfacial polymerization, the alkali metal salt of the hydroxyarylsubstituted spirodilactam in aqueous solution is contacted with a solution of the bisphenol haloformate and the diacid halide in an immiscible solvent such as chloroform, methylene chloride, toluene and cyclohexamone and the resulting reaction mixture is vigorously agitated as by shaking or stirring. Particularly good results are obtained if a small amount of a tertiary amine is added as a catalyst. Trialkylamines such as trimethylamine, triethylamine and dimethyldecylamine are suitable for this purpose. Triethylamine is preferred. Other materials known as phase transfer agents such as tetraalkylammonium halides and tetraalkylphosphonium halides are also useful for this purpose. Typical polymerization conditions include a reaction temperature below about 50° C. and preferably below 30° C. and a pressure that will maintain the reaction mixture in liquid form. Pressures from about 0.8 atmopspheres to about 5 atmospheres are suitable. The polyestercarbonate polymer is recovered by conventional methods from the resulting product mixture, e.g., methods such as filtration, precipitation or extraction.

The polyestercarbonate polymer is a linear polymer in which moieties of oxyaryl-substituted spirodilactam, illustratively produced by loss of hydroxylic hydrogen atoms of the spirodilactam of formula I alternates with either a moiety of di(carbonyloxyphenyl)alkane illustratively produced by loss of halogen from the di(halocarbonyloxyphenyl)alkane of formula IV or a moiety of di(carbonyl)arylene illustratively produced by loss of halogen from the diacid halide. Where the moiety from the spirodilactam is attached to a moiety of the bisphenol haloformate a carbonato or carbonyldioxy linkage is formed. When a moiety from the spirodilactam is attached to a moiety from the diacid halide, an ester or an oxycarbonyl linkage is present. The polymer product therefore contains two types of polymeric segment, one of which is an ester segment and one of which is a carbonate segment. In terms of the preferred reactants as described above, the polyestercarbonate polymer is represented by a first segment, e.g., an ester segment, of the formula

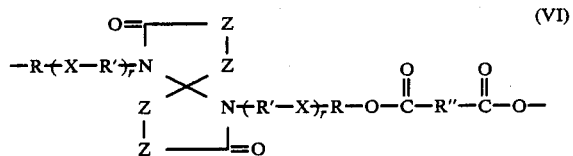

and by a second segment, i.e., a carbonate segment, which is represented by the formula

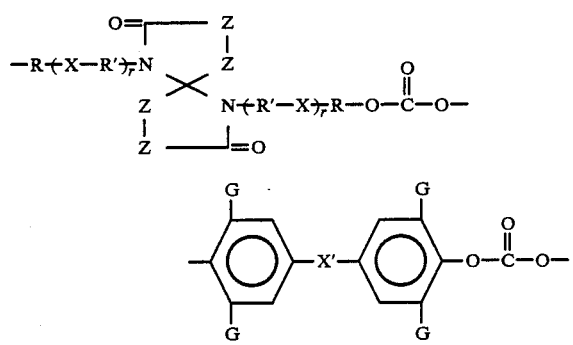

in which segments the terms have the previously stated meanings. The arrangement of the segments VI and VII within the polyestercarbonate polymer will be random and the molar ratio of the segments will be from about 9:1 to about 1:9 and reflect the molar ratio of the diacid halide and the bisphenol haloformate employed in the reaction mixture from which the polyestercarbonate was produced.

The nomenclature of such polymers is not easily determined because of the complexity of the polymeric structure but the identity of the polymers will be apparent from consideration of the formulas for the reactants and the segments of the polymeric product. However, by way of illustration is the polyestercarbonate polymer having an ester segment of moieties of 1,6-di(4-phenylene)-1,6-diazaspiro[4.4]nonane-2,7-dione and moieties of 1,3-phenylene, the moieties linked by a carbonyloxy linkage, and a carbonate segment of moieties of 1,6-di(4-phenylene)-1,6-diazaspiro[4.4]nonane-2,7-dione and moieties of 2,2-di(4-phenylene)propane, the moieties linked by a carbonyldioxy linkage. Such a polymer would illustratively be produced by reaction of the sodium salt of 1,6-di(4-hydroxyphenyl)-1,6-diazaspiro[4.4]nonane-2,7-dione, isophthaloyl chloride and 2,2-di(4-chlorocarbonyloxyphenyl)propane. Polymer products of the above segments VI and VII are preferred wherein each r is 0 and each R is a single aromatic ring, G is hydrogen or bromine and X' is a single aromatic ring. Spirodilactam moieties wherein each Z is >C(Z')$_2$ in which Z' is hydrogen or methyl, especially hydrogen, are preferred as are the spirodilactams having adjacent Z groups as Z" where Z" is benzo. Of particular interest are the polyestercarbonate polymers having a molecular weight range of from about 1,000 to about 100,000.

The novel polyestercarbonate terpolymers of the invention are thermoplastic polymers. Thus, the products of the invention enjoy the utilities possessed by other thermoplastics of being processable by conventional methods such as extrusion, injection molding and thermoforming into useful sheets, films and molded articles. However, the polyestercarbonate polymers of the invention are processed into shaped articles which are useful for high temperature applications where dimensional stability at elevated temperature is desired. Among such applications are containers for food and drink, retortable medical supplies and as base materials for electric and electronic applications.

The invention is further illustrated by the following Illustrative Embodiment which should not be regarded as limiting.

ILLUSTRATIVE EMBODIMENT I

To a 500 ml three-necked flask equipped with a mechanical stirrer, thermometer and nitrogen inlet and outlet was charged 3.38 g (0.01 mole) of 1,6-di(4-hydroxyphenyl)-1,6-diazaspiro[4.4]nonane-2,7-dione, 1.0 g (0.025 mole) of sodium hydroxide and 75 ml of distilled water. The mixture was stirred at a motor speed of 1200 rpm under nitrogen at a temperature no higher than 25° C. A solution of 1.1 g (0.005 mole) of isophthaloyl chloride and 1.76 g (0.005 mole of 2,2-di(4-chlorocarbonyloxyphenyl)propane in 95 ml of chloroform was added over a period of 30 minutes. The reaction mixture was stirred for 5 minutes after which 0.2 ml of triethylamine was added while the mixture was externally cooled with ice to keep the temperature of the mixture at 25° C. The reaction mixture was stirred for a period of 12 hours at a temperature of 25° C. and then washed with hydrochloric acid and distilled water and coagulated in methanol. The resulting polymer was recovered by filtration and dried in a vacuum oven at 80° C. overnight. The polymer had a limiting viscosity number (LVN) of 0.31 dl/g when measured in chloroform at room temperature. Examination of the product by $C^{13}$ nuclear magnetic resonance analysis indicated a structure of 2,2-di(4-phenylene)propane units and 1,3-phenylene units alternating with units of 1,6-di(4-phenylene-1,6-diazaspiro[4.4]nonane-2,7-dione, the units being separated by carbonato and carbonyloxy groups.

What is claimed is:

1. A polyestercarbonate polymer wherein the ester segment is represented by the formula

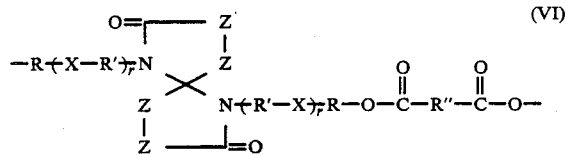

wherein Z independently is >C(Z')$_2$ in which Z' is hydrogen, lower alkyl, lower halo or phenyl, or Z is such that two adjacent Z groups taken together form a ring system Z" of from 5 to 7 ring atoms up to two of which are nitrogen, oxygen or sulfur with the remaining ring atoms being carbon atoms, there being up to 15 carbon atoms in each Z", two of which form a bridge between the carbon atoms connected by the adjacent Z groups, R independently is aromatic of up to 15 carbon atoms and up to 2 aromatic rings inclusive, R' independently is R or aliphatic of up to 10 carbon atoms inclusive, r independently is 0 or 1, X independently is a direct valence bond, or X is alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, and R" is divalent arylene of up to 20 carbon atoms and from 1 to 2 aromatic rings, and the carbonate segment is represented by the formula

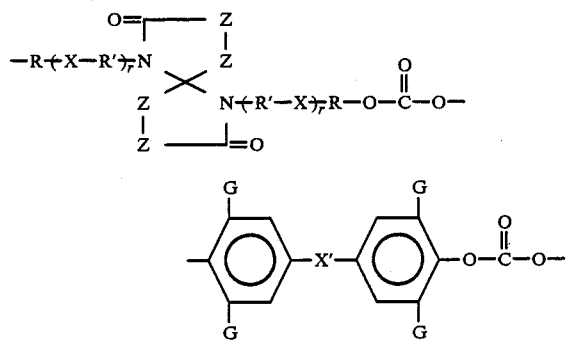

wherein G independently is hydrogen, lower alkyl or middle halogen and X' is alkylene of up to 15 carbon atoms inclusive.

2. The polymer of claim 1. wherein the molar ratio of the ester segments to the carbonate segments is from about 9:1 to about 1:9.

3. The polymer of claim 2 wherein R' is R.

4. The polymer of claim 3 wherein r is zero.

5. The polymer according to any one of claims 2,3,5 or 6 wherein Z is $>C(Z')_2$.

6. The polymer of claim 4 wherein R" has one aromatic ring.

7. The polymer of claim 6 wherein X' is 2,2-propylene and G is hydrogen.

8. The polymer of claim 7 wherein R is phenylene.

9. The polymer of claim 8 wherein Z' is hydrogen.

10. The polymer of claim 9 wherein R" is m-phenylene.

11. The polymer of claim 10 wherein R is p-phenylene.

12. The polymer of claim 11 wherein Z' is hydrogen.

13. The polymer according to any one of claims 2,3,5 or 6 wherein adjacent Z group are Z".

14. The polymer of claim 13 wherein R" has one aromatic ring.

15. The polymer of claim 14 wherein X' is 2,2-propylene and G is hydrogen.

16. The polymer of claim 15 wherein R is phenylene.

17. The polymer of claim 16 wherein Z" is benzo.

18. The polymer of claim 17 wherein R" is m-phenylene.

* * * * *